(No Model.)
R. P. PICTET.
PRODUCTION AND DEHYDRATION OF SULPHUROUS OXIDE AND APPARATUS THEREFOR.
No. 268,530.   Patented Dec. 5, 1882.
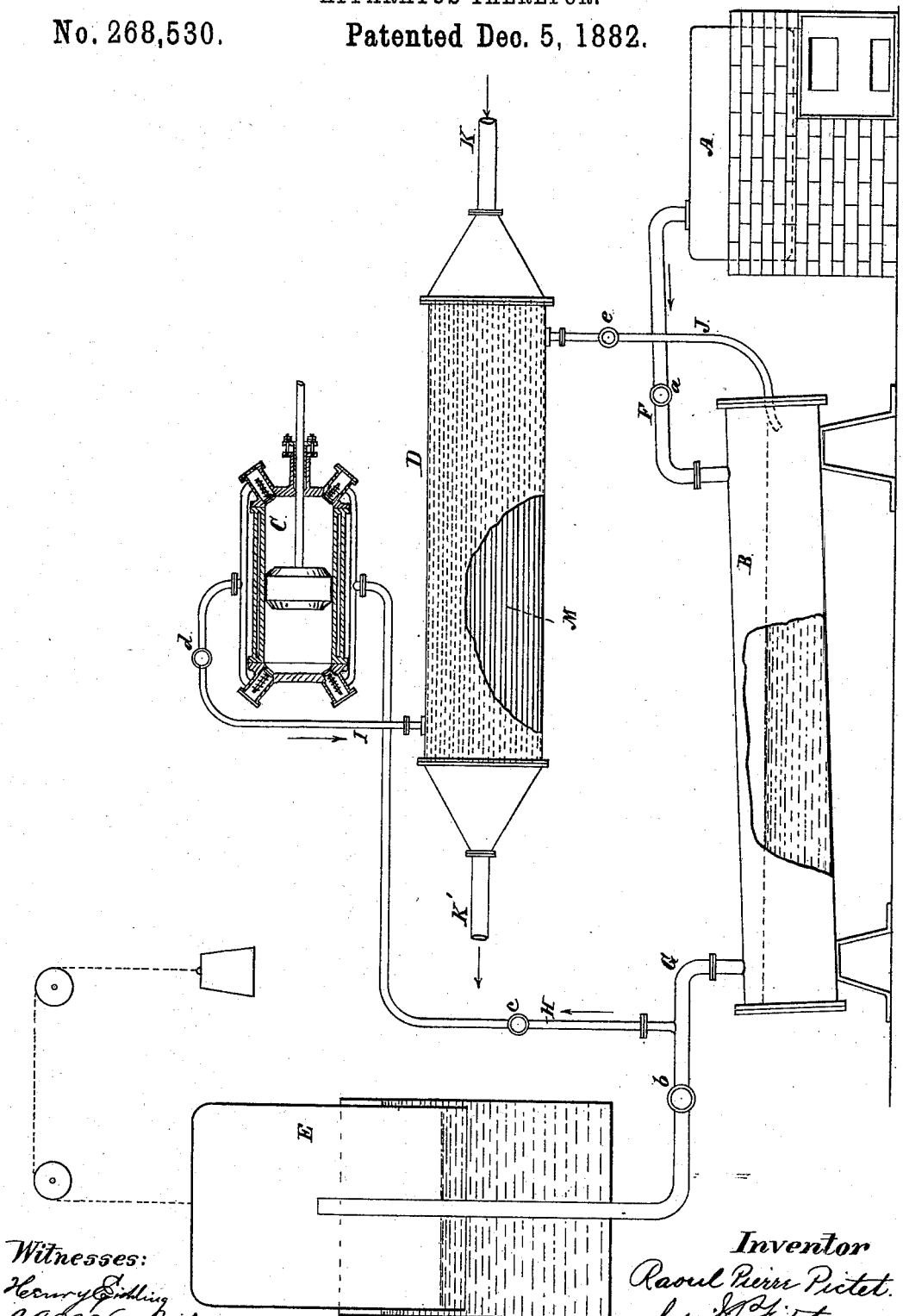

UNITED STATES PATENT OFFICE.

RAOUL PIERRE PICTET, OF GENEVA, SWITZERLAND, ASSIGNOR, BY MESNE ASSIGNMENTS, TO THE PICTET ARTIFICIAL ICE COMPANY, (LIMITED,) OF NEW YORK, N. Y.

PRODUCTION AND DEHYDRATION OF SULPHUROUS OXIDE AND APPARATUS THEREFOR.

SPECIFICATION forming part of Letters Patent No. 268,530, dated December 5, 1882.

Application filed July 27, 1882. (No model.) Patented in France May 26, 1882, No. 149,224.

*To all whom it may concern:*

Be it known that I, RAOUL PIERRE PICTET, a citizen of Switzerland, residing at Geneva, in the Republic of Switzerland, have invented new and useful Improvements in the Process of Production and Dehydration of Sulphurous Oxide, and in Apparatus connected therewith, of which the following is a specification, reference being had to the accompanying drawing, forming part of the description of said apparatus.

My improvement relates to the method by which, in the process of manufacturing sulphurous acid, all its contained water is removed, and the acid is thus rendered entirely anhydrous; and my invention consists, first, in the process or method of dehydrating gaseous sulphurous acid, consisting in introducing the said gaseous sulphurous acid into the presence, in a refrigerator, of liquid anhydrous sulphurous acid which is being gasified under the conditions hereinafter set forth, so as to produce in said refrigerator the temperature at which the hydrate of the gaseous sulphurous acid is crystallized thereout, substantially as hereinafter specified; and, second, in the apparatus shown in the drawings, and hereinafter described, for practicing said process.

Having observed in my laboratory experiments that hydrous sulphurous acid crystallizes at the low temperature of $-10°$ centigrade, I have availed myself of such action of this substance to produce perfectly anhydrous sulphurous acid economically, and on a large scale, for industrial purposes, by crystallizing out of the hydrous gas, as the gas is formed in the process of manufacture, all the contained water.

The following is a full and correct description of the process by which I accomplish the dehydration of the gas, and of the apparatus by which it may be practiced. I will first, for convenience, describe the said apparatus.

A is a retort in which the sulpurous-acid gas may be produced.

B is the refrigerating-cylinder, placed horizontally, and preferably a little inclined, as shown.

C is a suction and compressing pump.

D is a condenser, consisting of a cylinder provided interiorly with a number of tubes, and of the usual construction.

E is a gas-holder (oil being employed therein as the sealing-liquid) to receive the dehydrated gas.

F is a pipe leading from retort A to the refrigerator B, opening into the latter on its upper side. It has a stop-cock, $a$.

G is a pipe leading from the refrigerator to the gas-holder through its bottom, and extending upward within it above the level of the sealing-liquid. It is provided with stop-cock $b$.

H is a smaller pipe leading from the pipe G, near its connection with the refrigerator, to the pump C. This pipe has a stop-cock, $c$.

I is the outlet-pipe of the pump, leading thence to the condenser D, and having stop-cock $d$.

J is the acid-outlet pipe leading from condenser D to refrigerator B, and it has a stop-cock, $e$.

K and K' are respectively the water inlet and outlet pipes of the condenser.

The operation of this apparatus will appear clearly in the following description of my dehydrating process. The gaseous sulphurous acid, as it issues from the retort A, in which it is prepared by any of the known processes, but preferably by the decomposition of sulphuric acid of commerce by sulphur, is conducted through pipe F to the refrigerator D, where it is subjected to a temperature as low as $-10°$ centigrade. This low temperature I produce as follows: The said refrigerator, previously to the introduction into it of the sulphurous-acid gas from the retort A, is charged one-third full, or thereabout, with pure liquid anhydrous sulphurous acid, which may be prepared and rendered anhydrous in the ordinary way, (as by repeatedly subjecting the gas to the action of a suitable dehydrating agent,) and then condensing the gas to a liquid by a force-pump and a cold-water condenser. This liquid anhydrous sulphurous acid, when thus introduced into the refrigerator, being subject to the ordinary atmospheric pressure and temperature only, actively gasifies, whereby the temperature of the liquid acid and the entire interior of the refrigerator is reduced below —10° centigrade. The cock $b$ being closed, the gas as it is thus formed is drawn off by the pump $c$ (which is now put in operation) through the pipe H, and the gas is condensed to a liquid in the condenser D, and this liquid flows back to the refrigerator through the pipe J, the cock $e$ being open to permit it. The heat evolved by the compression of the gas by the pump is carried away by cold water, which is flowing through the tubes M, the water entering the condenser at K and being discharged therefrom at K'. By this alternate evaporation or gasifying and condensation of the anhydrous acid a very low temperature is, upon well-known principles, produced in the refrigerator, the body of the refrigerator itself and its pipe-connections having a like low temperature, as is shown by all of them becoming covered exteriorly with frost. The requisite conditions for the refrigeration of the sulphurous-acid gas in the process of manufacture (namely, at least —10° centigrade) being thus established, the cock $a$ is opened, and the gaseous sulphurous acid, as it issues from the retort A, is conducted through the pipe F immediately into the upper part of the refrigerator B, where it mingles with the cold gas there, and is brought in contact with the cold liquid acid and also the interior surface of the refrigerator, whereby its own temperature is reduced to a point at or below that at which crystallization of hydrous sulphurous acid takes place, when all the hydrate which the gas contains is crystallized and precipitated to the bottom of the refrigerator. The gas is thus completely deprived of every trace of water, when it passes on out of the refrigerator into the gas-holder E, which is so weighted and balanced as to keep the gas in it under atmospheric pressure, or thereabout. As soon as the introduction into the refrigerator of gas from the retort commences the cock $b$ is opened, so as to allow the gas to pass from the refrigerator to the gas-holder G, the pump C meantime drawing to itself only so much gas as is required, by its alternate evaporation and condensation, to maintain the requisite quantity of liquid acid in the refrigerator. The pump should be so operated as to keep the refrigerator about one-third full of the liquid acid. The pump is to be operated continuously or only intermittently, as may be necessary to keep the refrigerator properly supplied with liquid acid. The crystallized hydrates that will be deposited at the bottom of the refrigerator must be—at intervals, say, of four or five days—removed. This may be accomplished by first drawing off the liquid acid from the refrigerator while the temperature is maintained below —10° centigrade, and then allowing the temperature of the deposited crystals to rise above +15° centigrade, when they will melt and may be drawn away in a liquid form.

Having thus described my improved process and apparatus, what I claim as my invention, and desire to secure by Letters Patent, is—

1. The described process or method of dehydrating sulphurous acid, consisting in crystallizing out of it its contained hydrate by passing the acid, in a gaseous state, through a refrigerator in which pure anhydrous sulphurous acid is undergoing vaporization, and thereby producing in the refrigerator the temperature as low as that at which the hydrate of sulphurous acid crystallizes, as specified.

2. The described apparatus, consisting of the retort A, the refrigerator B, the gas-holder E, the pump C, and the condenser D, together with the pipes F, G, H, I, and J, respectively provided with the stop-cocks $a$, $b$, $c$, $d$, and $e$, all constructed and arranged to operate as and for the purpose hereinbefore described.

In witness that I claim the foregoing I have hereunto set my hand this 29th day of May, 1882.

RAOUL PIERRE PICTET.

Witnesses:
E. REY,
LYELL T. ADAMS,
*Genève.*